United States Patent
Wang et al.

(10) Patent No.: US 12,450,594 B1
(45) Date of Patent: Oct. 21, 2025

(54) HARDWARE SECURITY MODULE TO CONTROL A CLOUD DECENTRALIZED IDENTITY WALLET

(71) Applicant: Anonyome Labs, Inc., Salt Lake City, UT (US)

(72) Inventors: Wenjing Wang, Santa Clara, CA (US); George Mulhearn, Mansfield (AU); Paul Ashley, Toowong (AU)

(73) Assignee: Anonyome Labs, Inc., Salt Lake City, UT (US)

( * ) Notice: Subject to any disclaimer, the term of this patent is extended or adjusted under 35 U.S.C. 154(b) by 0 days.

(21) Appl. No.: 18/829,137

(22) Filed: Sep. 9, 2024

Related U.S. Application Data

(60) Provisional application No. 63/684,817, filed on Aug. 19, 2024.

(51) Int. Cl.
| | | |
|---|---|---|
| G06Q 20/36 | (2012.01) |
| G06F 21/30 | (2013.01) |
| G06F 21/45 | (2013.01) |
| G06Q 20/38 | (2012.01) |

(52) U.S. Cl.
CPC ......... *G06Q 20/3674* (2013.01); *G06F 21/30* (2013.01); *G06F 21/45* (2013.01); *G06Q 20/3825* (2013.01); *G06Q 20/3829* (2013.01)

(58) Field of Classification Search
CPC .......... G06Q 20/3674; G06Q 20/3825; G06Q 20/3829; G06F 21/30; G06F 21/45
USPC .......................................................... 705/75
See application file for complete search history.

(56) References Cited

U.S. PATENT DOCUMENTS

| | | | |
|---|---|---|---|
| 11,468,435 B1* | 10/2022 | Cheng ................... H04L 9/0827 |
| 2022/0253833 A1* | 8/2022 | Nonni ................ G06Q 20/3674 |
| 2024/0054482 A1* | 2/2024 | Sonsurkar ........ G06Q 20/40145 |
| 2024/0296445 A1* | 9/2024 | Parry .................... G06Q 20/405 |

FOREIGN PATENT DOCUMENTS

WO WO-2023006937 A1 * 2/2023 ............... H04L 9/14

OTHER PUBLICATIONS

Ahmed et al. A Blockchain Self-Sovereign Identity for Open Banking Secured by the Customer's Banking Cards, Future Internet 2023, published Jun. 8, 2023, 26 pages (Year: 2023).*

Turner "Understanding the Role of Hardware Security Modules in Credit-Card Payment and Retail Banking", Dec. 2, 2021, 7 pages (Year: 2021).*

Barker et al. "Recommendation for Key Management: Part 2—Best Practices for Key Management Organizations", National Institute of Standards and Technology, U.S. Department of Commerce, May 2019, 91 pages (Year: 2019).*

(Continued)

*Primary Examiner* — James D Nigh
(74) *Attorney, Agent, or Firm* — Cooley LLP

(57) ABSTRACT

An apparatus includes a hardware security module with a connection to a client device executing a mobile wallet application. The hardware security module includes hardware security module computer code instructions executed by a processor to store a private key, and supply a signature signed by the private key in response to a request from the client device that uses the signature to communicate with a decentralized identity wallet.

5 Claims, 4 Drawing Sheets

(56) References Cited

OTHER PUBLICATIONS

EMV® Integrated Circuit Card Specifications for Payment Systems, Book 2, Security and Key Management, Version 4.4, Oct. 2022, 192 pages (Year: 2022).*
Reed et al. Decentralized Identifiers (DIDs) v.013, W3C, Aug. 10, 2019, 56 pages (Year: 2019).*
Bukhari et al. Defining Unified Signature API Library for mobile apps to integrate with secure signature creation devices (SSCDs), 2024 IEEE International Conference on Blockchain, created on Aug. 20, 2024 and modified on Sep. 12, 2024, pp. 619-624 (Year: 2024).*
Kersic et al. Orchestrating Digital Wallets for On- and Off-Chain Decentralized Identity Management, IEEE Access, dated Aug. 1, 2023, pp. 78135-78151 (Year: 2023).*

\* cited by examiner

HARDWARE SECURITY MODULE TO CONTROL A CLOUD DECENTRALIZED IDENTITY WALLET

CROSS-REFERENCE TO RELATED APPLICATION

This application claims priority to U.S. Provisional Patent Application 63/684,817, filed Aug. 19, 2024, the contents of which are incorporated by reference.

FIELD OF THE INVENTION

This invention relates generally to machine communications in a computer network. More particularly, this invention is directed to a hardware security module to control a cloud decentralized identity wallet.

BACKGROUND OF THE INVENTION

Cloud Decentralized Identity (DI) Wallets are Verifiable Credential (VC) services that run in virtualized environments. A cloud DI wallet can act as an issuer, a verifier, or a holder. Current implementations of cloud DI wallets are based on common software stacks that support the peer-to-peer communication protocol (e.g., DIDComm messaging), Decentralized Identifier (DID) management, and data exchange protocols (e.g., Hyperledger Aries, OpenID4VC). However, they do not utilize proper enclaves to ensure isolation of cryptographic private keys from their server processes. In the case of Hyperledger Aries Cloud Agent-Python (ACA-Py), a widely adopted DI agent component of a cloud DI wallet, private keys are stored in a database (Aries Askar) and passed around in-memory. This is an undesirable security concern.

Enterprise Wallet is a special purpose cloud DI wallet where the users are the employees of an enterprise and manage VCs on behalf of the enterprise. Enterprise wallet users access the cloud wallet from their mobile devices. Using a mobile wallet App, they instruct the cloud wallet to perform certain DI operations, such as issue a credential (issuer), present a credential (holder), etc. However, one distinctive feature of the enterprise wallet is the access policy management. Not all employees of an enterprise have equal privilege to access a common set of VCs. In addition, some employees may be allowed to perform DI operations (e.g., present a proof from a VC) while others may only have read rights.

A hardware security module (HSM) is a hardened, tamper-resistant physical computing device that secures cryptographic processes. Such processes include generating, storing, and managing cryptographic keys, performing encryption and decryption functions for digital signatures, and other cryptographic functions.

The security concerns of a cloud DI wallet can be mitigated by incorporating an HSM. However, there are challenges. First, a cloud DI wallet may not have access to an HSM, because it is difficult to attach any physical hardware to a virtualized environment. Second, current cloud DI wallet practices do not accommodate the scenario where the cryptographic operations of digital signatures and their associated cryptographic keys are handled by separate processes on separate machines.

FIG. 1 depicts the current sequences in a DI cloud wallet. We use key creation and presentation signing to illustrate how the private key is handled in the cloud wallet. It is noted that the keypair creation and presentation signing are handled internally by the cloud wallet's DI agent (e.g., ACA-Py with Aries Askar). The mobile wallet does not possess the actual cryptographic keys nor the digital signature generation process. Instead, the mobile wallet instructs the cloud wallet through its Application Programming Interface (API) to perform the actions.

When a new cryptographic keypair needs to be added to the cloud wallet, the key creation works in the following steps:
1. The mobile wallet App 100 calls the cloud wallet API 102 as shown with signal 120 to create a cryptographic key pair for the cloud wallet DID.
2. The cloud wallet API forms signal 122 to request the cloud wallet DI agent 104 to create a key pair.
3. The cloud wallet DI agent creates the keypair 124 and store them in the database (e.g., using Aries Askar module).
4. The cloud wallet DI agent returns 126 the public key of the keypair to the mobile wallet App 100 through cloud wallet API 102, which sends forward signal 128.
5. The mobile wallet App 100 calls the cloud wallet API 102 with signal 130 to register this new key for the cloud wallet DID.
6. The cloud wallet API 102 passes the new public key to the cloud wallet DI agent 104, which creates or updates the DID document 132 associated with the wallet's DID and publishes 134 the DID document onto the Verifiable Data Registry (VDR) 106.

When the cloud wallet needs to sign a proof presentation, it works in the following steps:
1. Cloud wallet DI agent receives the proof request 136 from the verifier 110.
2. Through the cloud wallet API 102, the mobile wallet App 100 receives the notification 138, 140 of incoming proof request.
3. The mobile wallet App 100 makes a request 142 via the cloud wallet API 102, which sends a forward signal 144 to cloud wallet DI agent 104 to present a credential in response to the proof.
4. The cloud wallet DI agent assembles the proof structure and computes the bytes of the proof to be cryptographically signed 146.
5. The cloud wallet DI agent retrieves the private key from the database, signs the raw proof bytes and completes construction of a proof presentation 148.
6. The cloud wallet DI agent sends the proof presentation 150 back to the verifier 110.

In the case of enterprise wallet, its API 102 authenticates and authorizes (with its policy engine) the mobile wallet app user, ensuring only particular users can take certain actions; this includes scoped access to using VCs.

The major risk of not using an HSM with the cloud wallet is the security of the private keys associated with the wallet DID. The private keys are stored in a database and are retrieved when used (e.g., signing proof presentation). Loading the private key into memory for cryptographic operations performed by the cloud wallet DI agent imposes exposure risks to the private key, which can lead to theft of the private keys from the cloud wallet and impersonation of the cloud wallet's owner.

Thus, there is a need to overcome risks associated with private key processing in prior art solutions.

SUMMARY OF THE INVENTION

An apparatus includes a hardware security module with a connection to a client device executing a mobile wallet application. The hardware security module includes hardware security module computer code instructions executed by a processor to store a private key, and supply a signature signed by the private key in response to a request from the client device that uses the signature to communicate with a decentralized identity wallet.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
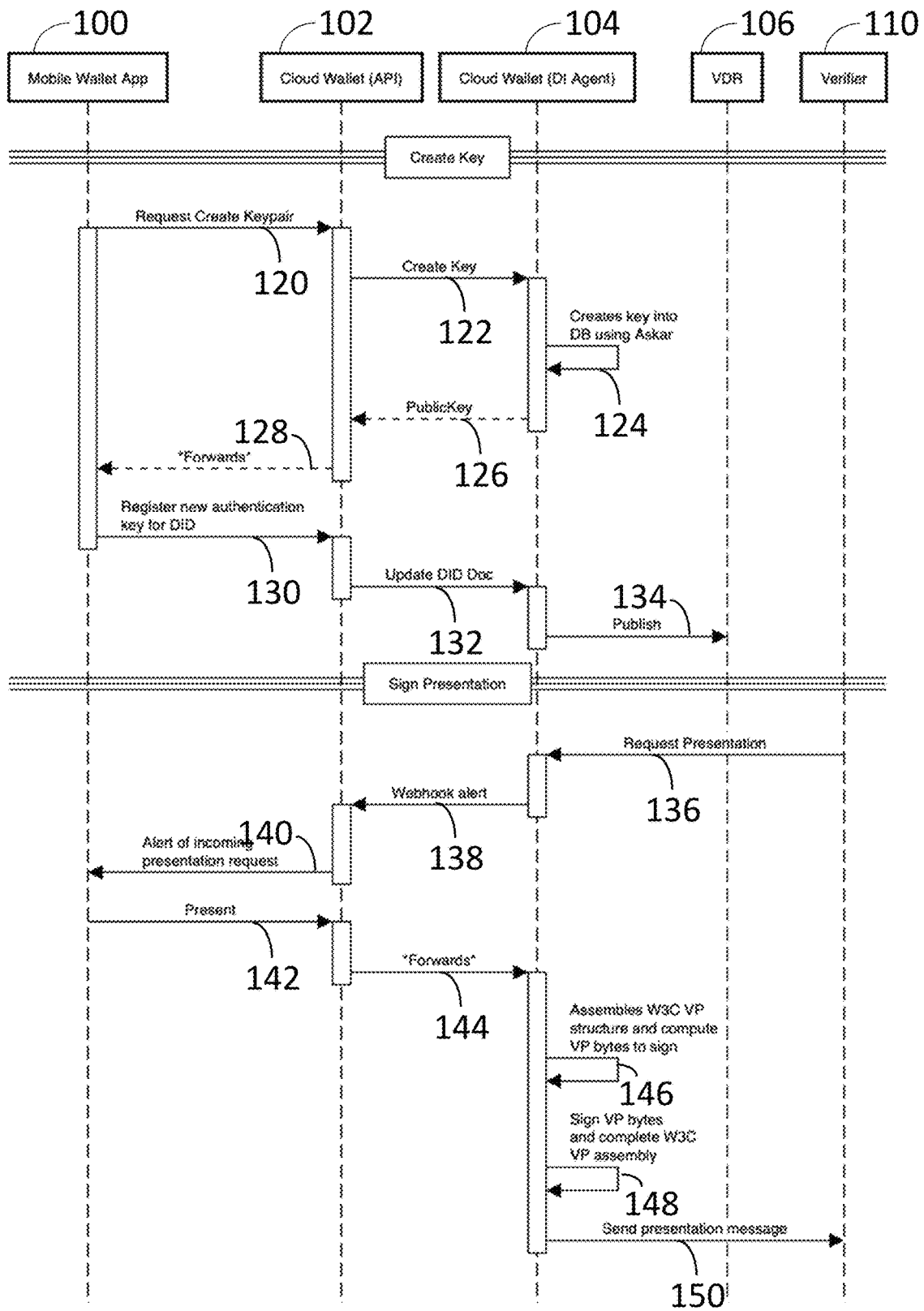
FIG. 1 illustrates prior art cloud wallet key creation and signing.
Figure 2:
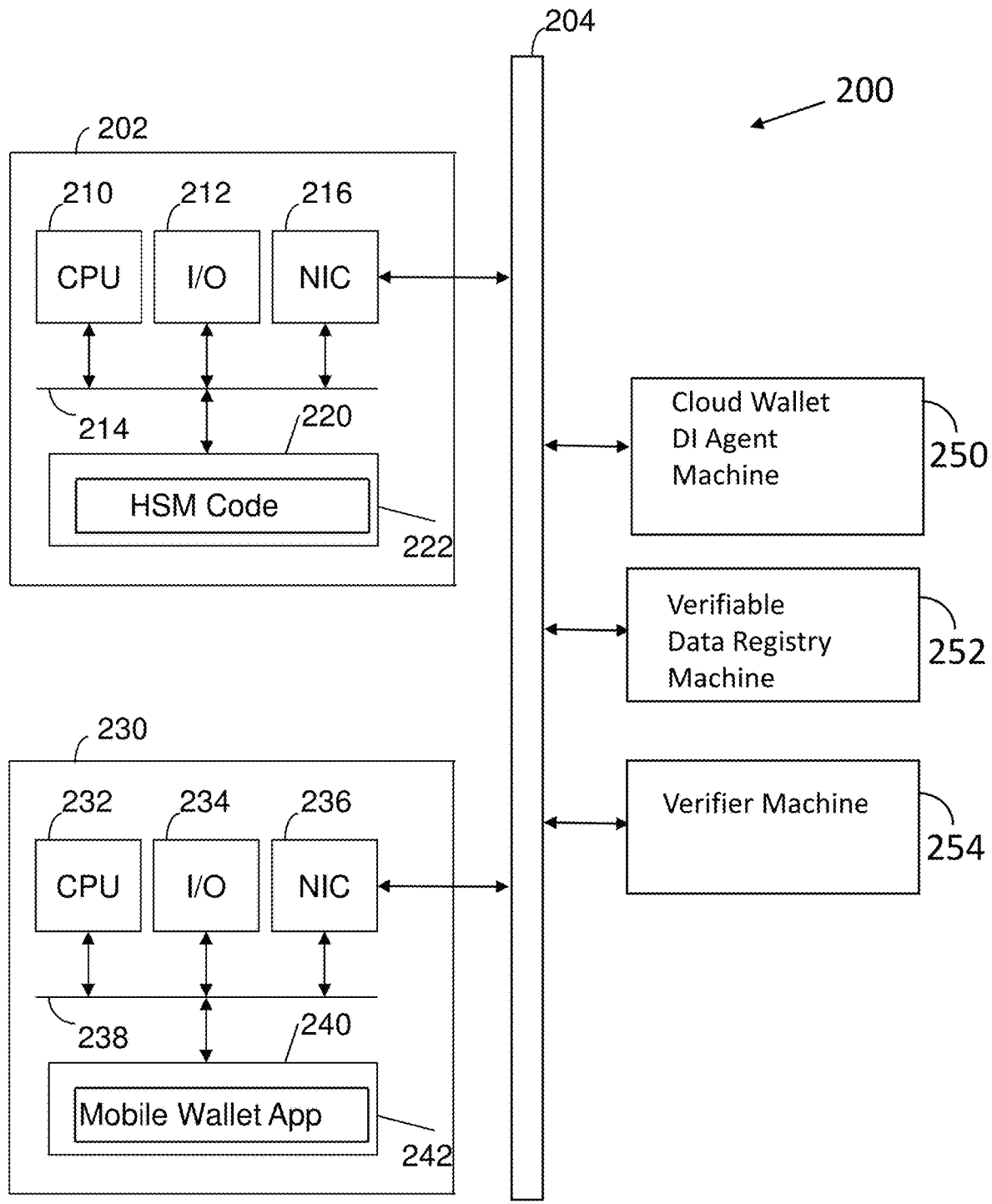
FIG. 2 illustrates a hardware security module interactive with different machines in a network environment.

FIG. 2 illustrates a system 200 configured in accordance with an embodiment of the invention. The system 200 includes a Hardware Security Module (HSM) 202. The HSM 202 separates the private keys from the cloud wallet using a physical external HSM. This physical HSM is securely held by the cloud wallet user. Typical use cases that can utilize this design include Physical HSM is required for the DI cloud wallet by compliance or regulations.

A cloud wallet user who wishes to export their credential and import to another cloud wallet.

The physical HSM can be connected to a client device 230 through wired or wireless methods, including USB cable, Bluetooth Low Energy, Near Field Communication (NFC) etc., depending on the connectivity capabilities of the HSM. Also, modern mobile phones contain an embedded HSM, e.g., iOS Secure Enclave, Android Strongbox.

By way of example, HSM 202 includes a processor 210 connected to a network interface circuit 216 via a bus 214. Input/output devices 212 may also be connected to the bus 214, but the input/output devices 212 are optional as the HSM may be operative as a dongle or other device without a user interface. The network interface circuit 216 is shown as a connection to network 204, which may be any combination of wired and wireless networks. Alternately, the network interface circuit 216 may be a hardware connection (e.g., a USB port) for direct connection to the client device 230. A memory 220 is also connected to bus 214. The memory 220 stores HSM code 222 executed by processor 210 to implement operations disclosed herein.

Client device 230 includes a processor 232, input/output devices 234 and a network interface circuit 236 connected via a bus 238. A memory 240 is also connected to the bus 238. The memory 240 stores a mobile wallet application 242 with instructions executed by processor 232 to implement operations discussed herein.

The network 204 is also connected to a cloud wallet DI agent machine 250, a verifiable data registry machine 252 and a verifier machine 254. The HSM 202 interacts with client machine 230, which in turn interacts with the cloud wallet DI agent machine 250, the verifiable data registry machine 252, and verifier machine 254, as demonstrated below.

Figure 3:
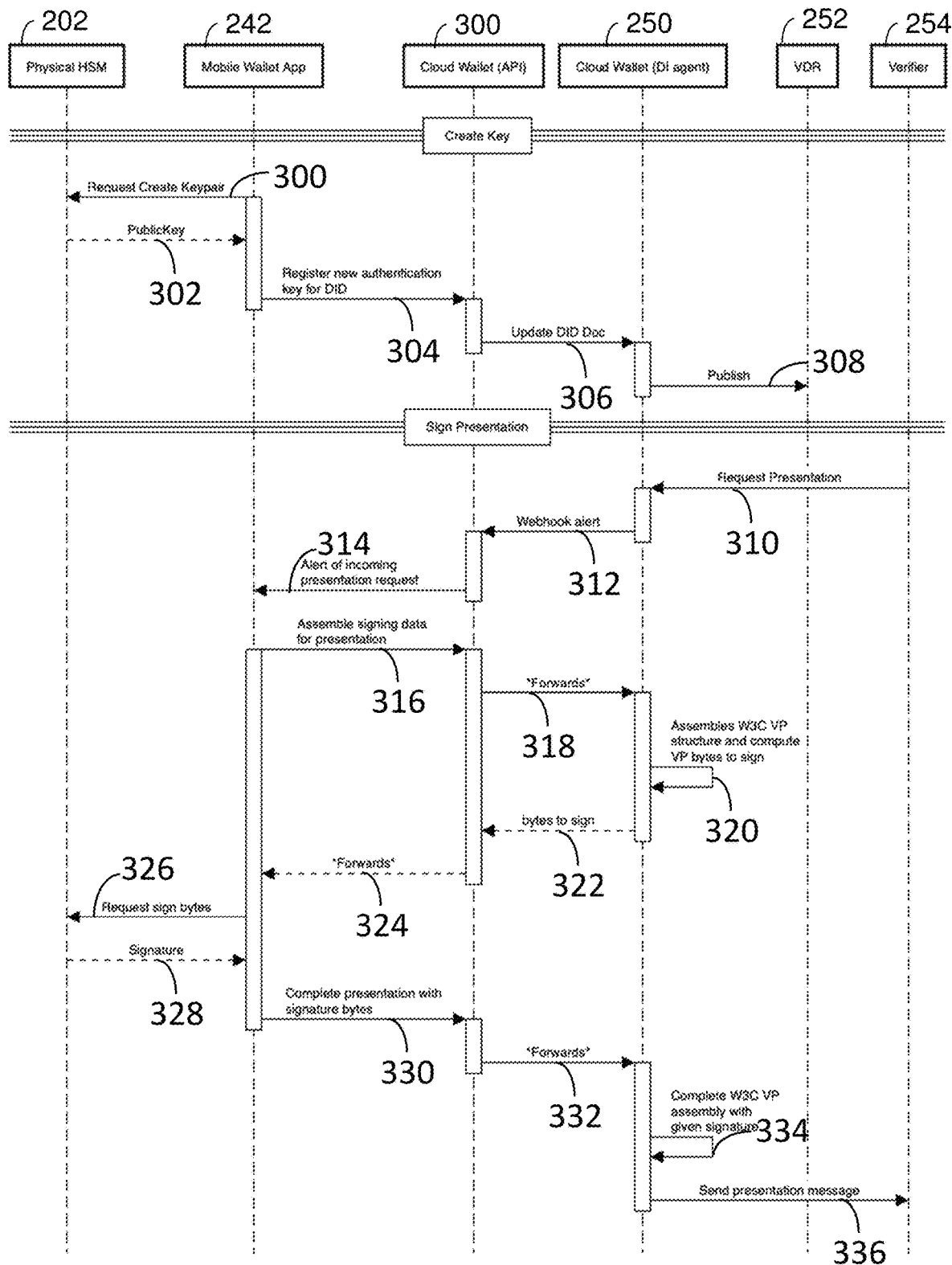
FIG. 3 illustrates a hardware security module controlling a cloud decentralized identity wallet.

FIG. 3 illustrates the operations of the cloud wallet with user-possessed external HSM 202. When a new key needs to be added to the cloud wallet, the key creation works in the following steps:

1. The mobile wallet App 242 makes a request 300 to create a cryptographic keypair in the physical HSM 202.
2. The physical HSM 202 performs the keypair creation cryptographic operation, and sends back the public key of the keypair 302 to the mobile wallet App 242.
3. The mobile wallet App 242 calls the cloud wallet API 300 with signal 304 to register this new key for the cloud wallet DID.
4. The cloud wallet API 300 passes the new public key 304 to cloud wallet DI agent 250, which creates or updates the DID document 306 associated with the wallet's DID and publishes 308 the DID document onto the VDR 252.

When a key stored in physical HSM needs to be used, e.g., when signing a proof presentation, the steps are as follows:

1. Cloud wallet DI agent receives the proof request from the verifier. That is, verifier 254 sends a proof request 310 to cloud wallet DI agent 250, which sends a signal 312 to cloud wallet API 300, which sends a signal 314 to the mobile wallet app 242.
2. The mobile wallet App 242 makes a request 316 to the cloud wallet API 300 for the assembly of the presentation's raw proof data.
3. The cloud wallet API forwards the request 318 to the cloud wallet DI agent 250.
4. The cloud wallet DI agent assembles the unsigned proof structure and computes the bytes of the proof to be signed 320.
5. The raw proof bytes 322 are forwarded to the mobile wallet App 242 from cloud wallet DI agent 250 via cloud wallet API 300, which generates forward signal 324.
6. The mobile wallet App 242 communicates with the physical HSM 202 and requests 326 signing of the raw proof bytes.
7. The physical HSM signs the raw proof bytes and returns the signed proof signature 328.
8. The proof signature is sent 330 back to cloud wallet API 300, which forwards 332 to the cloud wallet DI agent 250.
9. The cloud wallet DI agent completes construction of proof presentation with the proof signature attached 334.
10. The cloud wallet DI agent 250 sends the proof presentation 336 back to the verifier 254.

It is noted that in the case of an enterprise wallet, the external physical HSM introduces additional layer of physical security on top of the access control policy that is already present.

The primary risk with the user-possessed external HSM 202 is the unrestricted usage of the HSM. Because the key of the cloud wallet DID is stored in the external HSM, it can be used to sign arbitrary data on behalf of the DID, neither the cloud wallet nor the mobile wallet App can control, track or audit the usage of the HSM.

However, the physical HSM has its own built-in security mechanism such as PIN, passcode or biometrics to safeguard against unauthorized use of the device. It might be a difficult attack for someone to physically steal the HSM and tamper with its built-in security mechanism. Nonetheless, it does not prevent misbehavior or intentional misuse of the key with authorized access, e.g., a disgruntled employee using the HSM to sign other data outside the usage of cloud wallet One potential mitigation is establishing some governance framework which describes "when peers should trust signed data from the cloud wallet DID". For example, in the Trust over IP model, there can be a governance rule of "trust payloads signed by the cloud wallet DID only if they are sent over a DIDComm connection that was established with that cloud wallet DID's public DIDComm service".

Due to the fact that there is only a single physical HSM associated with a cloud wallet and the physical HSM needs to be present when signing a proof presentation, this makes the approach most suitable for the use cases where sharing the physical HSM can be easily and securely managed.

To address the limitations in the external physical HSM approach, the hybrid cloud HSM and physical HSM approach utilizes some trusted execution environment (TEE) in the cloud. Such TEE can be a physical HSM plugged into a server and made available to the cloud wallet or some remote TEEs like AWS Cloud HSM.

In this approach, the private key of the cloud wallet DID is stored in the cloud TEE. When invoking the cloud wallet's APIs to perform DI operations, the mobile wallet App authenticates itself using a user-possessed physical HSM. The biggest advantage of this approach is to utilize cloud TEE to secure and protect cloud wallet's keys, and in the meantime, employ HSM to secure and protect user's keys, that give them access to cloud wallet operations.

In the case of an enterprise wallet, the policy engine ensures that only authorized users can perform actions that involve usage of the TEE. The extra layer of physical security comes from the fact that the users authenticate themselves with the physical HSM.

Figure 4:
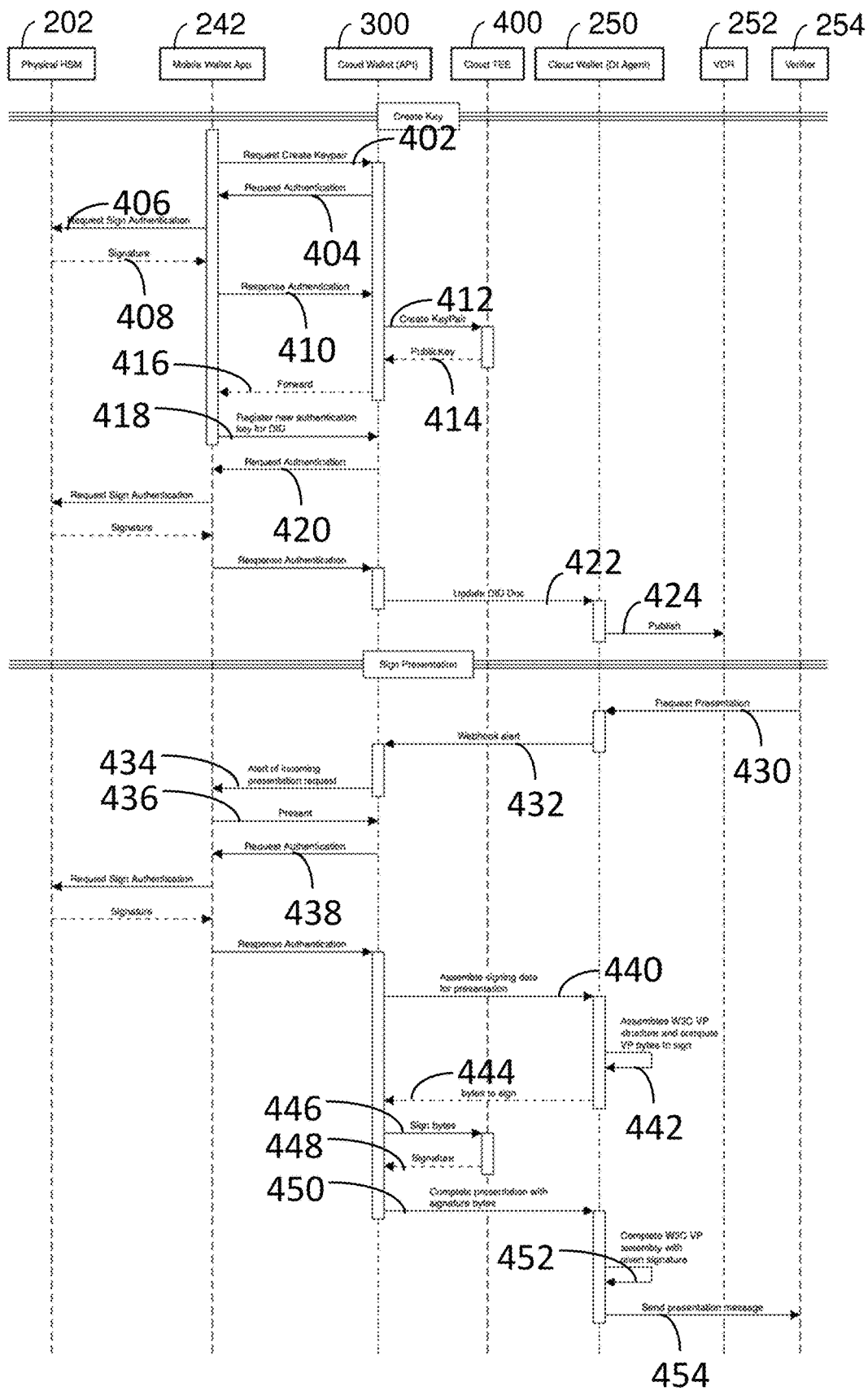
FIG. 4 illustrates a hardware security module controlling private key storage in connection with a cloud trusted execution environment.

FIG. 4 illustrates the operations of cloud wallet with hybrid cloud TEE 400 and user-possessed external HSM 202. When a new key needs to be added to the cloud wallet, the key creation works in the following steps.
1. The mobile wallet App 242 makes a request 402 to the cloud wallet API 300 to create a keypair.
2. The cloud wallet API 300 challenges the mobile wallet App 242 for authentication 404.
3. The mobile wallet App 242 communicates with physical HSM 202 with a request 406 to obtain signature 408 on authentication.
4. The mobile wallet App 242 sends a response authentication 410 to the cloud wallet API 300.
5. The cloud wallet API 300 makes a request 412 to cloud TEE 400 to create a keypair.
6. The cloud TEE 400 creates the keypair and returns 414 the public key of the pair to cloud wallet API 300, which is then forwarded 416 to the mobile wallet App 242.
7. The mobile wallet App makes a call 418 to the cloud wallet API 300 and requests the key to be registered for the DID.
8. The cloud wallet API 300 challenges 420 the mobile wallet App 242 for authentication and repeats steps 2-4 (signals 406 and 408).
9. The cloud wallet API 300 passes 422 the new public key to the cloud wallet DI agent 250. The cloud wallet DI agent creates or updates the DID document associated with the wallet's DID and publishes 424 the DID document onto the VDR 252.

The signing of a proof presentation as an example of how the key is used works as follows:
1. Cloud wallet DI agent 250 receives the proof request 430 from the verifier 254, which is passed 432 to the cloud wallet API 300.
2. Through the cloud wallet API 300, the mobile wallet App receives the notification 434 of incoming proof request.
3. The mobile wallet App 242 calls 436 the cloud wallet API 300 to respond to the proof request.
4. The cloud wallet API 300 challenges 438 the mobile wallet App 242 for authentication.
5. The mobile wallet App 242 communicates with physical HSM 202 to obtain signature on authentication (same as signals 406, 408).
6. The mobile wallet App 242 responds to the authentication challenge with HSM signed authentication (same as signal 410).
7. The cloud wallet API 300 makes a request 440 to the cloud wallet DI agent 250 to assemble the presentation's raw proof data.
8. The cloud wallet DI agent 250 assembles the unsigned proof structure and computes the bytes of the proof to be signed 442, which are passed 444 to the cloud wallet API 300.
9. The cloud wallet API 300 takes the raw proof bytes and communicates 446 with the cloud TEE 400 to request signing of the raw proof bytes.
10. The cloud TEE signs the raw proof bytes and returns 448 the proof signature.
11. The cloud wallet API 300 forwards 450 the proof signature to the cloud wallet DI agent 250.
12. The cloud wallet DI agent 250 completes construction of proof presentation with the proof signature attached 452.
13. The cloud wallet DI agent 250 sends 454 the proof presentation back to the verifier 254.

In this approach, a critical step to securely authenticate a user at cloud wallet API is to introduce physical HSM 202 signed authentication. There are potentially many ways to do this, two embodiments are described below.

The cloud wallet user creates their WebAuthn credentials for the cloud wallet (a.k.a. passkeys) on the physical HSM 202. The user's public key is submitted to the cloud wallet API 300 following WebAuthn specification. The detailed steps are:
1. When the mobile wallet App invokes the cloud wallet API for DI operations, the cloud wallet API sends back a challenge.
2. The mobile wallet App then forwards the challenge to their physical HSM and requests signing.
3. The physical HSM may require certain verifications to grant the access, e.g., PIN. After successful verification, the physical HSM performs the cryptographic operations and returns a signed assertion.
4. The assertion is further forwarded to the cloud wallet API as response to the challenge.
5. The assertion is checked against the public key of the user to complete the authentication.

In another approach, the cloud wallet user is issued with a verifiable credential which is stored in their mobile wallet App. The authentication key of their mobile wallet DID is managed by their physical HSM. The detailed steps are:
1. When the mobile wallet App invokes the cloud wallet API for DI operations, the cloud wallet DI agent sends a proof request to the user's mobile wallet.

2. The mobile wallet App prepares the verifiable credential that satisfy the proof request, derives the proof, assembles the signing data for presentation.
3. The mobile wallet App then communicates with the physical HSM and requests the proof data to be signed.
4. The HSM returns the signed proof to the mobile wallet App, which completes construction of proof presentation with the signed proof signature and sends to the cloud wallet API.
5. The cloud wallet DI agent verifies the proof presentation and completes the authentication.

It is noted that in the cases when cloud wallet DI agent and cloud wallet API are running on different machines, it is possible to incorporate other frameworks (e.g., OAuth) to facilitate the authentication.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include but are not limited to: magnetic media, optical media, magneto-optical media, and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using an object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:
1. A system, comprising:
a hardware security module with a connection to a client device executing a mobile wallet application, the hardware security module including hardware security module computer code instructions executed by a processor to:
store a private key, and
supply a signature signed by the private key in response to a request from the client device that uses the signature to communicate with a decentralized identity wallet; and
a cloud wallet decentralized identity agent machine executing the decentralized identity wallet and performing cryptographic operations in communication with a verifiable data registry machine and a verifier machine;
wherein the mobile wallet application communicates with the decentralized identity wallet through an application program interface that supports interactions to:
send a proof presentation request from the decentralized identity wallet to the mobile wallet application;
send a request for raw proof data from the mobile wallet application to the decentralized identity wallet;
send bytes of the proof to be signed from the decentralized identity wallet to the mobile wallet application;
send a signed proof signature from the mobile wallet application to the decentralized identity wallet, which sends the signed proof signature to the verifier machine.

2. The system of claim 1 wherein the hardware security module computer code includes instructions executed by the processor to perform cryptographic operations to sign verifiable credentials and proof presentations that are stored in a remote decentralized identity wallet.

3. The system of claim 1 wherein the hardware security module computer code includes instructions executed by the processor to use the private key for authentication in response to a decentralized identity wallet application program interface.

4. The system of claim 1 wherein the hardware security module computer code includes instructions executed by the processor to use the private key for signing a verifiable credential to authenticate a user in response to a decentralized identity wallet application program interface.

5. The system of claim 1 wherein the hardware security module computer code includes instructions executed by the processor to use the private key for authentication to a remote decentralized identity wallet application program interface, where the decentralized identity wallet performs cryptographic operations in a cloud based trusted execution environment.

* * * * *